Figure 1:
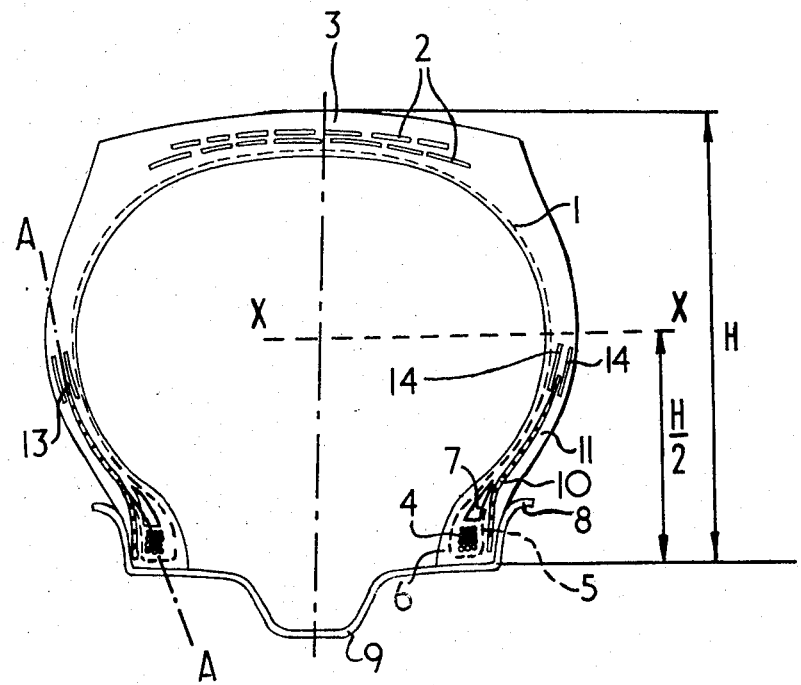

United States Patent
Mezzanotte et al.

[11] 3,853,163
[45] Dec. 10, 1974

[54] RADIAL TIRES PROVIDED WITH A SIDEWALL STIFFENING CIRCUMFERENTIAL STRUCTURE

[75] Inventors: Mario Mezzanotte, Milan;
Ferdinando Carretta, Monza;
Gianni Turchetti, Bresso, all of Italy

[73] Assignee: Industrie Pirelli S.p.A., Milan, Italy

[22] Filed: May 29, 1973

[21] Appl. No.: 364,335

[30] Foreign Application Priority Data
May 31, 1972 Italy ................................ 25138/72
Dec. 13, 1972 Italy ................................ 8774/72

[52] U.S. Cl. ............. 152/355, 152/353 R, 152/357, 152/362 R
[51] Int. Cl. ....................... B60c 9/02, B60c 15/06
[58] Field of Search ........... 152/354, 355, 353, 357, 152/362 R, 374

[56] References Cited
UNITED STATES PATENTS

| | | | |
|---|---|---|---|
| 3,172,445 | 3/1965 | Boussu et al. ....................... | 152/354 |
| 3,253,636 | 5/1966 | Travers ............................... | 152/354 |
| 3,392,773 | 7/1968 | Warren et al. ....................... | 152/354 |
| 3,480,065 | 11/1969 | Verdier ............................... | 152/354 |
| 3,500,890 | 3/1970 | Boileau ............................... | 152/354 |

*Primary Examiner*—Drayton E. Hoffman
*Attorney, Agent, or Firm*—Clelle W. Upchurch

[57] ABSTRACT

A pneumatic tire for vehicles having radial textile cords is provided with circumferential rigidity without loss in riding comfort by disposing a strip of metal cords axially outwardly of the core of the bead and the carcass in the lower portion of the sidewall substantially on the path of the flexional neutral axis thereof to 25 percent to 45 percent of the section height of the tire with the metal cords of the strip being inclined at an angle ranging from 5° to 15° with respect to the circumferential lines of the tire.

5 Claims, 2 Drawing Figures

RADIAL TIRES PROVIDED WITH A SIDEWALL STIFFENING CIRCUMFERENTIAL STRUCTURE

The present invention relates generally to pneumatic tires for vehicle wheels, and in particular to pneumatic tires provided with a radial carcass, i.e., a carcass whose cords lie in radial planes or form small angles with such planes.

It is known that radial tires have undeniable advantages with respect to the tires provided with a crossed-ply carcass, and it is also known that they are much more flexible at their sidewalls than conventional tires.

This greater flexibility of the sidewalls imparts to the radial tire the advantage of possessing a high degree of comfort, which would not be otherwise achieved. On the other hand, this flexibility can result in excessive circumferential, radial, or transverse deformation depending upon the direction in which the major stresses are exerted.

In particular, when the tire is subjected to the action of the load and to strong variations of motion such as from sudden acceleration or braking, the tangential stresses which take place in the travelling direction between the ground and the tread originate circumferential deformations in the carrying structure of the tire itself. Such deformation may cause premature deterioration in the zone disposed between the end of the rim flange and the lower portion of the sidewall.

Such deterioration may be a rupture or detachment of the plies, chiefly due to the passage from the bead which is a rigid zone to the sidewall which is flexible.

In order to eliminate the above disadvantages, it has been proposed to increase the rigidity of the lower portion of the sidewalls by the insertion of various kinds of reinforcements. For example, shaped elements made of hard compounds may be used. Alternately, additional strips of cords which cross one another and the carcass cords may be provided to impart the desired rigidity.

In the present description the expression "lower portion of the sidewall" means the portion extending between the point of maximum section of the tire (corresponding approximately to one half of its section height) and the bead of the tire itself.

Although the above proposed solutions to the problem impart a greater rigidity to the sidewalls, the rigidity is increased in different degrees in all directions, including the radial, circumferential and transverse direction of the tire.

It follows that an increase of rigidity in a stated direction of the tire, as for instance in its circumferential or transverse direction, results in a corresponding increase of its radial rigidity, and consequently in a reduced degree of comfort of the tire in use.

The object of the present invention is to provide a radial carcass tire having sidewalls possessing a high circumferential rigidity without a simultaneous increase in radial rigidity.

The object of the invention is accomplished by providing a pneumatic tire of the radial type with stiffening strips of metal cords which extend radially in each sidewall from adjacent to the cores of the tire beads to a height ranging from about 25 percent to about 45 percent of the height of the tire with the metal cords of the strip being inclined on the average at an angle of from 5° to 15° with respect to the circumferential lines of the tire. The textile cords of the tire's carcass lie in radial planes or form small angles with such planes. The textile cords extend from one bead to the other and are turned about the hard rubber core of each bead. The strips of metal cords are disposed axially outwardly from the turned over ends of the textile cords and the tire's carcass from adjacent to the bead upwardly in the lower portion of each sidewall.

In the present specification the expression "textile cords" is used in the meaning which is commonly attributed to it in the tire industry and which comprises, by way of example, organic textile materials, as cotton and rayon, fibers from synthetic polymers, as polyamide fibers, polyester fibers and the like.

The "inner side" of the bead core is that directed towards the tire cavity intended to receive the inner tube.

The above described reinforcing structure has proved to be particularly advantageous, since it imparts a high circumferential rigidity to radial tires without however influencing negatively the radial rigidity of the same and consequently their degree of comfort.

Probably, this result is obtained by virtue of the combined action of a plurality of factors; in fact, the particular inclination of the metal cords of the reinforcing strip inserted in the lower portion of the sidewalls and the high elastic modulus of the metal cords with respect to that of the textile cords of the carcass limit the deformations in the circumferential direction of the tire (and in particular the circumferential displacements of the radial cords of the carcass) which are originated by the tangential stresses which are exerted in the travelling direction, between the ground and the tread.

In this way it is possible to limit the relative displacements between the elements comprised in the rigid portion of the beads and those comprised in the lower portion of the sidewall.

The reduction of these displacements leads to the consequent result of eliminating the possible detachments or ruptures which can occur in general in the zones subjected to the highest stresses, namely the zones lying at the height of the rim flanges, where the beads join to the lower portions of the respective sidewalls.

Moreover, the arrangement of the reinforcing strip substantially at the neutral axis of the lower portion of each sidewall avoids tension and compression stresses on the strip during radial bending of the sidewalls, so that the stiffening action of the strip in the radial direction of the tire is reduced to a minimum with substantially no effect on tire comfort.

It has been moreover surprisingly ascertained that the positioning of the strip of metal cords in the lower portion of the sidewall gives rise to a further advantage concerning the behaviour of the tire in use.

This advantage relates to the high torsional resistance which the tire provided by the invention offers to the tangential/transverse stresses, combined to each other, when the direction of the tire's motion is varied such as during cornering.

Such torsional resistance involves a further limitation of the relative displacements between the elements disposed in the rigid portion of the bead and those disposed in the lower portion of the sidewall, reducing the possibility of detachments or ruptures, due not only to the deformations originated by the variations of motion, but also to those originated by the variations in the direction of motion.

Probably, this is due to the fact that the reinforcing strip extends radially in the lower portion of the sidewall for a height ranging between 25 percent and 45 percent of the section height of the tire, to the particular inclination of the metal cords, which limits the circumferential displacement of the textile cords of the carcass, and to the high modulus of elasticity of the metal cords with respect to that of the textile cords.

According to a preferred embodiment of the present invention, the strip of metal cords extends radially from the zone of the cores to a height corresponding to 35 percent of the section height of the tire.

According to another preferred embodiment of the invention, the strip of metal cords is axially adjacent, respectively, to the turn-ups of the carcass in the zone of the beads and to the carcass in the zone which is radially outwardly with respect to the ends of the turned up ends of the textile cords.

The advantage of this embodiment is that of further limiting the circumferential displacement of the textile cords of the carcass, since their axial distance from the metal cords of the reinforcing strip is reduced to the simple thickness of the rubber which separates them mutually.

According to a still further embodiment of the present invention, the radially outermost zone of the strip of metal cords is wound up by a rubber shaped element having a hardness ranging between 55° and 75° Shore.

In this way it is possible to obtain the further advantage that the rubber shaped element makes gradual the reduction of circumferential rigidity from the lower portion of the sidewall to the upper portion of the same, absorbing in part the relative displacements between the two portions, and cooperating in this way to improve the fatigue resistance at the radially outermost zone of the strip of metal cords.

Figure 2:
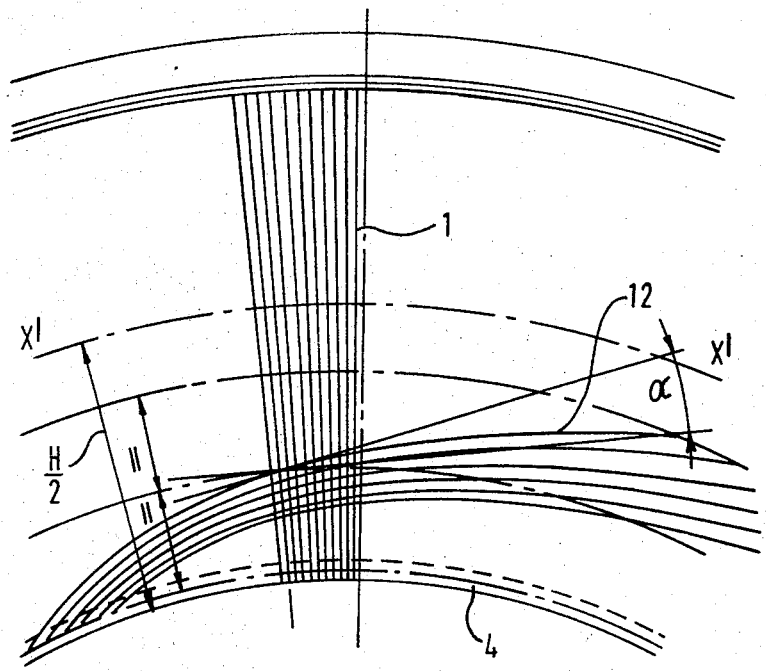

The invention is better illustrated with reference to the accompanying drawings of a non-limiting example, in which:

FIG. 1 represents diagrammatically the cross section of one embodiment of a tire according to the present invention; and FIG. 2 represents a side view of the embodiment of FIG. 1, with parts broken away to better illustrate the travel of the cords.

FIG. 1 shows the cross section of a radial tire comprising a carcass 1, a breaker 2 and a tread 3.

The carcass 1 is provided with a single ply of nylon cords having a count of 1400/3 d Tex and lying in radial planes as illustrated in FIGS. 1 and 2. The cords are turned up about the bead core 4 from the inside towards the outside, and the turn-ups 5 extend in the zone of the bead 6, like in the normal structure of conventional radial tires.

A filling 7 of a compound normally used in conventional tires is situated in a radially outer position with respect to the bead core 4. The filling has a substantially triangular form in cross section and extends as far as the height of the flange 8 of the rim 9.

A strip of metal cord fabric 10, extending radially from the zone of the bead core 4 as far as the lower portion of the sidewall 11, is disposed in an axially outer position with respect to the turn-up 5, at a height corresponding to 35 percent of the section height H of the tire.

Line XX of FIG. 1, lying at one half of H, separates in general the lower portion of the sidewall from the upper portion of the same. As shown in FIG. 2, the metal cords 12 of the strip of fabric 10 are parallel to one another and are inclined in the average at an angle $\alpha$ of 10° with respect to the circumferential line X'X'. The metal cords have a 3 × 4/0.22 structure formed by three strands, each of which is constituted by four wires, each wire having a diameter of 0.22 mm.

At the lower portion of the sidewall 11, namely in the radially outer zone with respect to the flange 8, the strip of metal fabric 10 lies substantially on the flexional neutral axis AA, as defined above, while at the bead 6, namely in the radially inner zone with respect to said flange 8, the strip 10 deviates in an axially outer direction from said neutral axis AA.

In this way the fabric strip 10 protects the bead against possible abrasion by the rim flange.

The radially outermost zone 13 of strip 10 is wound up by a rubber shaped element 14 having a hardness of 65° Shore. In this way it is possible to obtain a gradual reduction of the circumferential rigidity from the lower portion of the sidewall to the upper portion of the same.

For clearness of illustration, the various elements constituting the described structure have been represented as separated from one another; actually, they are in close contact. So, the axially inner rubberized surface of the strip of metal cord fabric 10, in the bead zone, is in close contact with the axially outer rubberized surface of the portion 5, while, in the lower portion of the sidewall 11, it is in contact with the axially outer rubberized surface of the carcass 1, with the exception of its end 13, which is in contact with the rubber shaped element 14.

Although the invention has been described in detail for the purpose of illustration, it is to be understood that such detail is solely for that purpose and that variations therein can be made by those skilled in the art without departing from the spirit and scope of the invention except as it may be limited by the claims.

What we claim is:

1. In a pneumatic tire for vehicle wheels having a carcass comprising textile cords which extend substantially radially from one bead to the other and are turned from inside to outside about the cores of the beads and a strip of metal cords disposed in the lower portion of each sidewall of the tire axially outwardly from the bead and the carcass, the improvement wherein the said strip of metal cords extends radially from adjacent the core of the bead substantially on the path of the flexional neutral axis in the lower portion of the sidewall to from about 25 percent to 45 percent of the section height of the tire, the metal cords of the strip being inclined in the average at an angle ranging from 5° to 15° with respect to the circumferential lines of the tire.

2. The pneumatic tire of claim 1 wherein the strip of metal cords extends radially from adjacent the core of the bead to about 35 percent of the section height of the tire.

3. The pneumatic tire of claim 1 wherein the strip of metal cords is axially outwardly adjacent to the turned over portion of the textile cords and to the carcass.

4. The pneumatic tire of claim 3 wherein the radially outermost portion of the strip of metal cords is wound in a shaped rubber element having a Shore hardness of 55° to 75°.

5. The tire of claim 1 wherein the textile cords from a small angle with the radial plane of the carcass.

* * * * *